(12) United States Patent
Saleh et al.

(10) Patent No.: US 11,276,211 B2
(45) Date of Patent: Mar. 15, 2022

(54) INTEGRATION OF VARIABLE RATE SHADING AND SUPER-SAMPLE SHADING

(71) Applicant: Advanced Micro Devices, Inc., Santa Clara, CA (US)

(72) Inventors: Skyler Jonathon Saleh, La Jolla, CA (US); Andrew S. Pomianowski, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/228,692

(22) Filed: Dec. 20, 2018

(65) Prior Publication Data

US 2020/0202594 A1 Jun. 25, 2020

(51) Int. Cl.
| | | |
|---|---|---|
| G06T 11/40 | (2006.01) | |
| G06T 1/60 | (2006.01) | |
| G06T 1/20 | (2006.01) | |

(52) U.S. Cl.
CPC .............. G06T 11/40 (2013.01); G06T 1/20 (2013.01); G06T 1/60 (2013.01)

(58) Field of Classification Search
CPC .............. G06T 11/40; G06T 1/20; G06T 1/60
USPC ........................................................ 345/589
See application file for complete search history.

(56) References Cited

U.S. PATENT DOCUMENTS

| | | | |
|---|---|---|---|
| 8,044,956 B1 * | 10/2011 | Kilgard | ................. G06T 15/503 345/426 |
| 8,368,706 B2 | 2/2013 | Tamaoki | |
| 8,547,395 B1 * | 10/2013 | Hutchins | ................. G06T 11/40 345/611 |
| 9,355,483 B2 | 5/2016 | Lum et al. | |
| 2004/0001069 A1 | 1/2004 | Snyder et al. | |
| 2010/0002000 A1 * | 1/2010 | Everitt | .................. G06T 15/503 345/426 |
| 2014/0327696 A1 * | 11/2014 | Pomianowski | ........... G06T 1/60 345/611 |
| 2015/0170345 A1 * | 6/2015 | Vaidyanathan | ....... G06T 15/503 345/599 |
| 2015/0178983 A1 * | 6/2015 | Akenine-Moller | ..... G06T 15/80 345/426 |
| 2017/0161940 A1 * | 6/2017 | Liktor | .................... G09G 5/363 |
| 2017/0293995 A1 | 10/2017 | Saleh et al. | |
| 2018/0240268 A1 * | 8/2018 | Nevraev | ................. G06T 15/80 |
| 2018/0308280 A1 * | 10/2018 | Surti | ....................... G06T 15/80 |

(Continued)

FOREIGN PATENT DOCUMENTS

| | | |
|---|---|---|
| KR | 10-2009-0040515 A | 4/2009 |
| KR | 10-2010-0029223 A | 3/2010 |

*Primary Examiner* — Jin Ge
(74) *Attorney, Agent, or Firm* — Volpe Koenig

(57) ABSTRACT

A technique for performing rasterization and pixel shading with decoupled resolution is provided herein. The technique involves performing rasterization as normal to generate quads. The quads are accumulated into a tile buffer. A shading rate is determined for the contents of the tile buffer. If the shading rate is a sub-sampling shading rate, then the quads in the tile buffer are down-sampled, which reduces the amount of work to be performed by a pixel shader. The shaded down-sampled quads are then restored to the resolution of the render target. If the shading rate is a super-sampling shading rate, then the quads in the tile buffer are up-sampled. The results of the shaded down-sampled or up-sampled quads are written to the render target.

20 Claims, 7 Drawing Sheets

(56) References Cited

U.S. PATENT DOCUMENTS

2019/0005713 A1* 1/2019 Nevraev ............... G06T 15/80
2019/0066371 A1* 2/2019 Saleh ................ G06T 15/405

* cited by examiner

INTEGRATION OF VARIABLE RATE SHADING AND SUPER-SAMPLE SHADING

BACKGROUND

Three-dimensional ("3D") graphics processing pipelines perform a series of steps to convert input geometry into a two-dimensional ("2D") image for display on a screen. Some of the steps include rasterization and pixel shading. Rasterization involves identifying which pixels (or sub-pixel samples) are covered by triangles provided by stages of the pipeline prior to the rasterizer. The output of rasterization includes quads—a block of 2×2 pixels—and coverage data that indicates which samples are covered by the pixels of the quads. The pixel shader shades the pixels of the quads, and the pixels of the quads are then written to a frame buffer. Because pixel shading is very resource-intensive, techniques are constantly being developed to improve efficiency of pixel shading.

BRIEF DESCRIPTION OF THE DRAWINGS

A more detailed understanding can be had from the following description, given by way of example in conjunction with the accompanying drawings wherein.

DETAILED DESCRIPTION

A technique for performing rasterization and pixel shading with decoupled resolution is provided herein. The technique involves performing rasterization as normal to generate quads. The quads are accumulated into a tile buffer. A shading rate is determined for the contents of the tile buffer. If the shading rate is a sub-sampling shading rate, then the quads in the tile buffer are down-sampled, which reduces the amount of work to be performed by a pixel shader. The shaded down-sampled quads are then restored to the resolution of the render target. If the shading rate is a super-sampling shading rate, then the quads in the tile buffer are up-sampled. The results of the shaded down-sampled or up-sampled quads are written to the render target.

Figure 1:
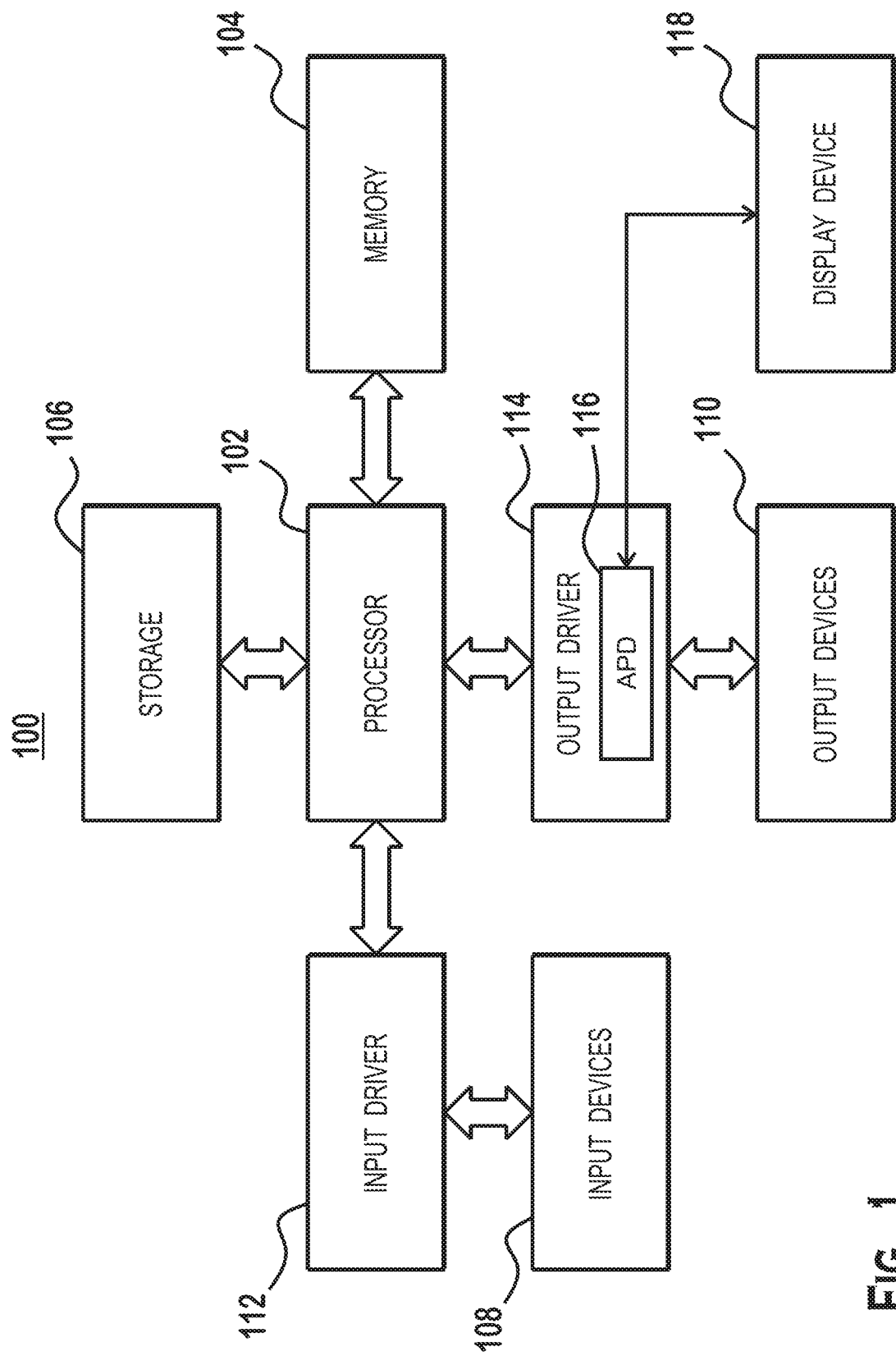
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
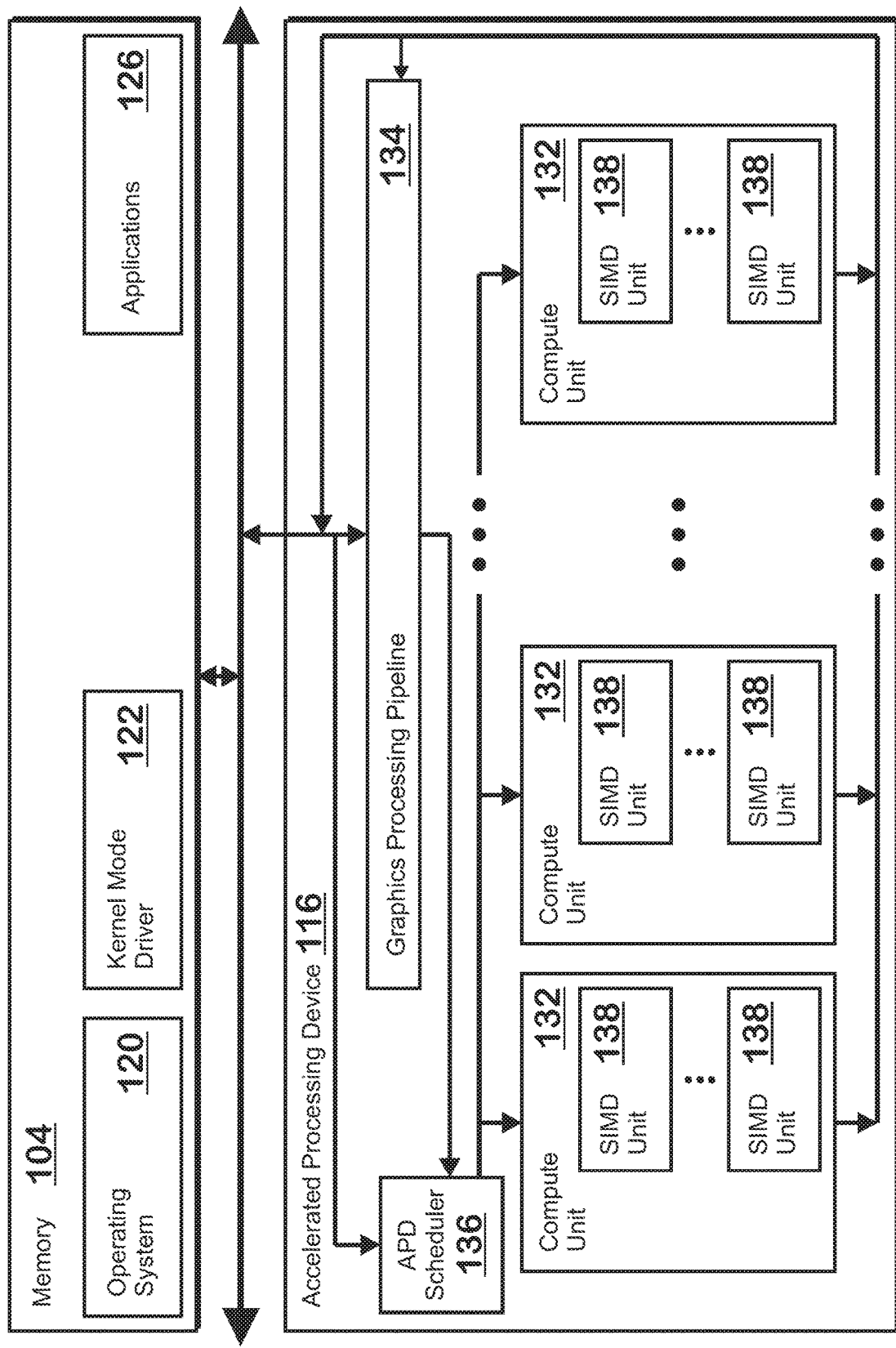
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
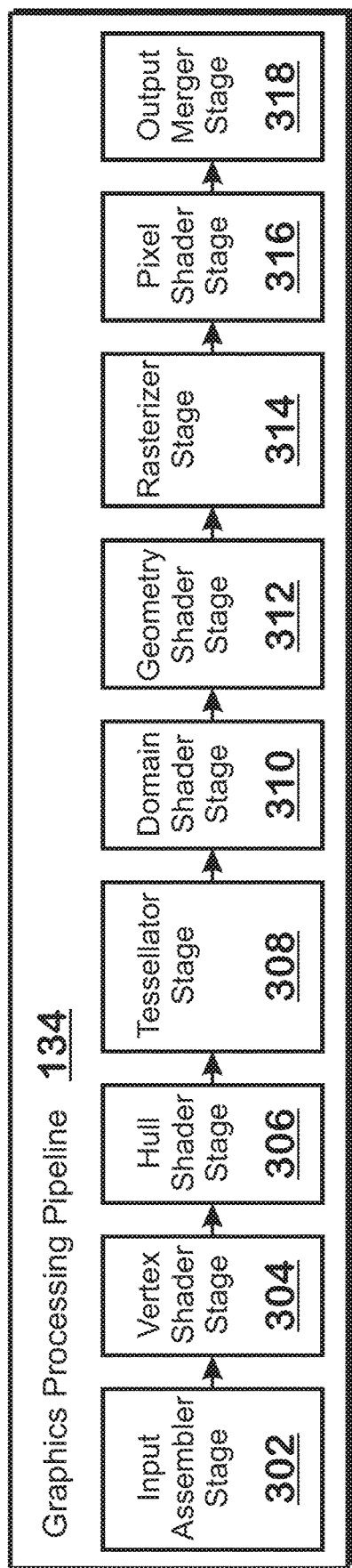
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-tocubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

In one mode of operation, the rasterization performed by the rasterizer stage 314 is done at the same resolution as pixel shading performed by the pixel shader stage 316. By way background, the rasterizer stage 314 accepts triangles from earlier stages and performs scan conversion on the triangles to generate fragments. The fragments are data for individual pixels of a render target and include information such as location, depth, and coverage data, and later, after the pixel shader stage, shading data such as colors. The render target is the destination image to which rendering is occurring (i.e., colors or other values are being written).

Typically, the fragments are grouped into quads, each quad including fragments corresponding to four neighboring pixel locations (that is, 2×2 fragments). Scan conversion of a triangle involves generating a fragment for each pixel location covered by the triangle. If the render target is a multi-sample image, then each pixel has multiple sample locations, each of which is tested for coverage. The fragment records coverage data for the samples of that fragment. The fragments that are generated by the rasterizer stage 314 are transmitted to the pixel shader stage 316, which shades the fragments (determines color values for those fragments), and may determine other values as well.

Performing rasterization and pixel shading at the same resolution means that for each fragment generated by the rasterizer, the pixel shader 316 performs a calculation to determine a color for that fragment. In other words, the area of screen-space occupied by a pixel is the same area as the precision with which colors are determined. In one example, in the SIMD-based hardware of the compute units 132, each fragment generated by the rasterizer stage 314 is shaded by a different work-item. Thus, there is a one-to-one correspondence between generated fragments and work-items spawned to shade those fragments. Note that the rasterizer stage 314 typically performs depth testing, culling fragments occluded by previously-rendered fragments. Thus, there is a one-to-one correspondence between fragments that survive this depth culling and work-items spawned to color those surviving fragments, although additional work-items may be spawned to render helper fragments for quads, which are ultimately discarded. Helper fragments are fragments that are not covered by a triangle but that are generated as part of a quad anyway to assist with calculating derivatives for texture sampling. Another way to understand the mode of operation in which rasterization is performed at the same resolution as shading is that the resolution at which the edges of a triangle can be defined is equivalent to the resolution at which colors of that triangle can be defined.

One issue with the above mode of operation, in which rasterization occurs at the same resolution as pixel shading occurs for triangles that have a fixed color or low frequency change in color. For such triangles, pixel shading operations on nearby fragments produce the same or similar color and are effectively redundant. A similar result could therefore be performed with a much smaller number of pixel shader operations. Thus, it is advantageous to reduce the shading resolution, with respect to the rasterization resolution, according to a technique referred to herein as variable rate shading ("VRS"). The advantage of such a technique is a reduction in the number of pixel shader operations being performed, which reduces processing load and improves performance. The details of VRS are described in detail below.

One issue with VRS is the issue of integration of that technique with super sample anti-aliasing ("SSAA"). SSAA is a technique whereby each render target pixel has multiple coverage and color samples. More specifically, in this technique, the graphics processing pipeline 134 both rasterizes and shades at a resolution that is higher than the resolution of the render target to generate a super-sampled image. Then, the graphics processing pipeline 134 "resolves" that super-sampled image through an anti-aliasing technique to generate an image at the resolution of the render target.

An issue arises in a system that is capable of performing both VRS and SSAA. Specifically, in one implementation, it is possible to switch both VRS and SSAA on, such that VRS is operating to reduce the resolution of shading with respect to the resolution of the render target and SSAA is operating to increase the resolution of shading with respect to the resolution of the render target. This mode of operation could produce undefined or unexpected results and thus may not be desirable. Thus techniques are presented herein for integrating SSAA and VRS cohesively into a graphics processing pipeline 134.

FIG. 4 illustrates a technique for rasterizing, shading, and outputting a rendered image using one of SSAA, VRS, or neither, according to an example. The technique begins with step 402, where the rasterizer stage 314 rasterizes a triangle received from an earlier stage of the graphics processing pipeline 134 to determine covered samples and to generate fragments including indications of those covered samples. The rasterization generates one fragment for each pixel in the render target for which there is coverage by a triangle. A fragment is a grouping of data that corresponds to a single pixel and has information such as sample coverage, color data for each sample (after the pixel shader stage), depth data for each sample, and possibly other types of data. Fragments are used to color the pixels of the frame buffer in the output merger stage 318. A sample is a point within a screen pixel for which information such as coverage information, depth information, and color information can be determined individually. In some modes of operation, there are multiple samples for each render target pixel. In general, the purpose of having multiple samples for each render target pixel is to perform anti-aliasing, which improves the visual appearance of hard edges within images. In other modes of operation, there is only one sample per render target pixel.

In step 402, the rasterizer stage 314 determines which samples are covered by received primitives and which samples are not covered. In general, the rasterizer stage 314 receives triangles from earlier stages of the graphics processing pipeline 134 and rasterizes those triangles to generate the fragments. Rasterizing a triangle includes determining which pixels of the render target are covered by the triangle, and which samples within those covered pixels are covered by the triangle, if there are multiple samples per pixel. Any technically feasible technique for rasterizing triangles may be used. A fragment is generated for each pixel for which one sample is covered.

The rasterizer stage 314 also performs depth testing at step 402. In one example, depth testing involves examining the depth value for each sample covered by the triangle and comparing those depth values to a depth buffer that stores depth values for already-processed triangles. The depth value for a particular sample is compared to the depth value stored at the depth buffer for the same position as the particular sample. If the depth buffer indicates that the sample is occluded, then that sample is marked as not covered and if the depth buffer indicates that the sample is not occluded, then that sample survives. The data indicating which sample locations are covered and not occluded is passed on to other parts of the graphics processing pipeline 134 for later processing as described elsewhere in this description. Herein, the term "covered" when applied a sample means that the sample is covered by a triangle and passes the depth test and the term "not covered" or "uncovered" means that a sample is either not covered by a triangle or is covered by a triangle but does not pass the depth test.

Rasterization outputs fragments in 2×2 groups known as quads. More specifically, for each pixel of the render target that has at least one sample covered by the triangle, the rasterizer stage 314 generates a fragment. The rasterizer 314 creates quads from these fragments. Quads include fragments for an adjacent section of 2×2 pixels, even if one or more such fragments are completely not covered by the triangle (where "completely not covered" means that no samples of the fragment are covered by the triangle and not occluded). The fragments that are completely not covered are called helper fragments. Helper fragments are used by the pixel shader stage 316 to calculate spatial derivatives for shading. Often, these spatial derivatives are used for mipmap selection and filtering for textures, but the spatial derivatives can be used for other purposes.

Also at step 402, the rasterizer stage 314 determines one or more shading rates for the samples of the triangle. The shading rate may be one of a sub-sample shading rate, a one-to-one shading rate, or a super-sample shading rate. A sub-sample shading rate means that the resolution of pixel shading is lower than the resolution of the render target (but not the resolution of the samples). A one-to-one shading rate means that the resolution of pixel shading is the same as the resolution of the render target. A super-sample shading rate means that the resolution of pixel shading is higher than the resolution of the render target. Note that it is possible for the resolution of pixel shading to be different from the resolution of rasterization (coverage determination) even with a super-sample shading rate. Specifically, it is possible for the rasterizer to determine sample coverage for a particular number of samples per pixel and then for pixel shading to occur at a lower rate than that number of samples. For example, it is possible for rasterization to occur for four samples for each fragment, but for pixel shading to occur only twice per fragment.

The resolution of pixel shading, also called the shading rate, defines the number of fragments that are shaded together in the pixel shader stage 316. More specifically, for sub-sampling, the resolution of pixel shading determines how many pixel locations in the render target are given the color determined by a single work-item in the pixel shader stage 316. For example, if the shading rate is one quarter, then a work-item in the pixel shader stage 316 determines a color for four pixel locations in the render target. For super-sampling, the resolution of pixel shading determines how many samples of a given fragment are given the color determined by a single work-item. For example, if the resolution of pixel shading is "4×," then four different work-items determine colors for four different samples per fragment generated by the rasterizer stage 314.

The shading rate may be determined on a per-triangle basis, a per-shading rate tile basis, or on a per-shading rate tile basis for individual triangles. For shading on a per-triangle basis, a unit in the graphics processing pipeline 134 upstream of the pixel shader determines a shading rate for triangles sent to the rasterizer stage 314. In an example, a vertex shader stage 304 determines shading rates for the triangles processed by that stage. In another example, the geometry shader stage 312 determines shading rates for triangles emitted by that stage. For shading on a per-shading rate tile basis, the rasterizer stage 314 determines shading rates for different shading rate tiles of the render target. The render target is divided into shading rate tiles that each comprises multiple pixels of the render target. More specifically, the render target is "tiled" into shading rate tiles, each of which can have a different shading rate. Any technically feasible technique for determining the shading rate for a shading rate tile may be used. In one example, a shading rate tile image is used. A shading rate tile image has information for different shading rate tiles of a render target that indicates the shading rate of those shading rate tiles. The shading rate image may be specified explicitly or algorithmically by the application.

For shading on a per-shading rate tile basis for individual triangles, the combination of per shading rate tile and per triangle information is used to determine a shading rate for any given quad. Specifically, each triangle is associated with a triangle shading rate image that defines the shading rates for the different portions of the triangle.

It is possible for the size of shading rate tiles to be the same size as the number of render target pixels covered by the tile buffer or larger than that buffer. However, the contents of the tile buffer at any particular point in time will have the same shading rate.

At step 404, the rasterizer stage 314 accumulates quads generated as the result of rasterization in step 402 into a tile buffer 510. A tile buffer may store any technically feasible number of quads. In one example, a tile buffer stores four adjacent quads in a 2×2 array. The quads in the tile buffer correspond to a contiguous portion of the render target. This allows for downsampling of the quads in a smaller number of quads when VRS is used. After accumulating quads into the tile buffer, the rasterizer stage 314 triggers step 406. Note, this triggering may occur with at least some portion of the tile buffer 510 empty. More specifically, the tile buffer 510 stores quads from a contiguous portion of screen space, from the same triangle. It is possible for there to be no coverage for a particular triangle in at least some of that contiguous portion, even if there is coverage in a different part of that contiguous portion. In such situations, a non-full tile buffer 510 would be used in step 406 (generating modified-rate quads based on the shading rate).

At step 406, the rasterizer stage 314 examines the contents of the tile buffer 510 and generates modified-rate quads based on the shading rate. There are three possible ways this can happen. As described above, for any particular instance of the contents of the tile buffer, a shading rate is defined for all those contents. This shading rate can be one of a sub-sampling rate, a 1:1 rate, or a super sampling rate. If the shading rate is a sub-sampling rate, then the rasterizer stage 314 down-samples the quads of the tile buffer 510 to generate modified-rate quads. The resulting down-sampled quads include coarse fragments that are bigger than the pixels of the render target. The purpose of down-sampling quads is to reduce the number of pixel shader work-items that are spawned to shade the fragments. Specifically, because the pixel shader launches one work-item per fragment, making the fragments larger results in fewer work-items being spawned, which results in a faster completion of the shading workload.

With a sub-sampling shading rate, it is possible that the amount of coverage information available in a down-sampled quad is insufficient to represent the full resolution of coverage data of the quads in the tile buffer 510. If that is the case, then down-sampling also includes compressing the coverage data.

If the shading rate is a 1:1 rate, then the rasterizer stage 314 simply outputs the quads of the tile buffer 510 unmodified, as the modified-rate quads.

If the shading rate is a super-sampling rate, then the rasterizer stage 314 up-samples the quads of the tile buffer 510 to generate modified-rate quads. The resulting up-sampled quads include more quads than the quads in the tile buffer 510. The factor by which the number of quads is increased is equal to the super-sampling rate.

At step 408, the rasterizer stage 314 assigns centroid positions for the fragments of the quads. The manner in which this is done depends on several factors, including the shading rate, the numbers and positions of samples in the tile buffer quads, and possibly other factors. The centroid is the position at which pixel attributes such as texture coordinates are evaluated.

At step 410, the pixel shader stage 316 shades the fragments of the quads. As described elsewhere herein, one work-item is spawned per fragment. The pixel shader shades fragments using the centroids determined at step 408. It is also possible for the pixel shader to modify coverage for any particular fragment, by, for example, switching one or more samples of the fragment from covered to not covered or from not covered to covered. In an example, the pixel shader determines that an alpha value corresponding to a particular covered sample is completely transparent (e.g., has an alpha value of 0) and therefore sets that sample to be not covered. It should be understood that the foregoing is just one example and that a pixel shader program, which can be written by an application developer, could potentially modify coverage in any technically feasible manner.

At step 412, if the quads were downsampled, then the output merger stage 318 restores the original resolution of those quads, which includes applying fine coverage data from the rasterizer stage 314. Additional details are provided with respect to FIG. 4D.

At step 414, the output merger stage 318 performs late pixel operations and writes the samples of the quads to the frame buffer. If the shaded quads were down-sampled (i.e., if VRS was used), then the output merger stage 318 writes the data from the quads restored at step 412. If the shaded quads were up-sampled or if a 1:1 shading rate was used, then the data from the quads output by the pixel shader 316 is used to shade the render target.

Figure 4A:
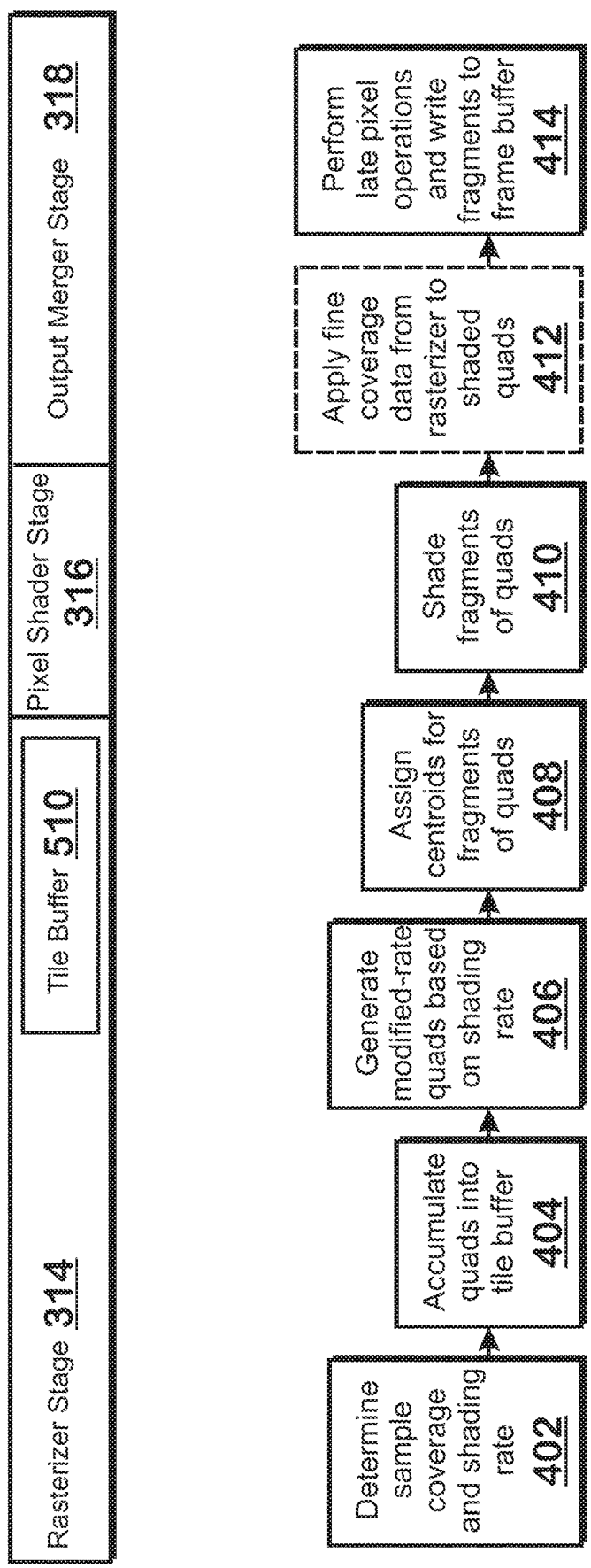
FIGS. 4A-4D illustrates a technique for performing rasterization at a different resolution than pixel shading, according to an example.
Figure 4B:
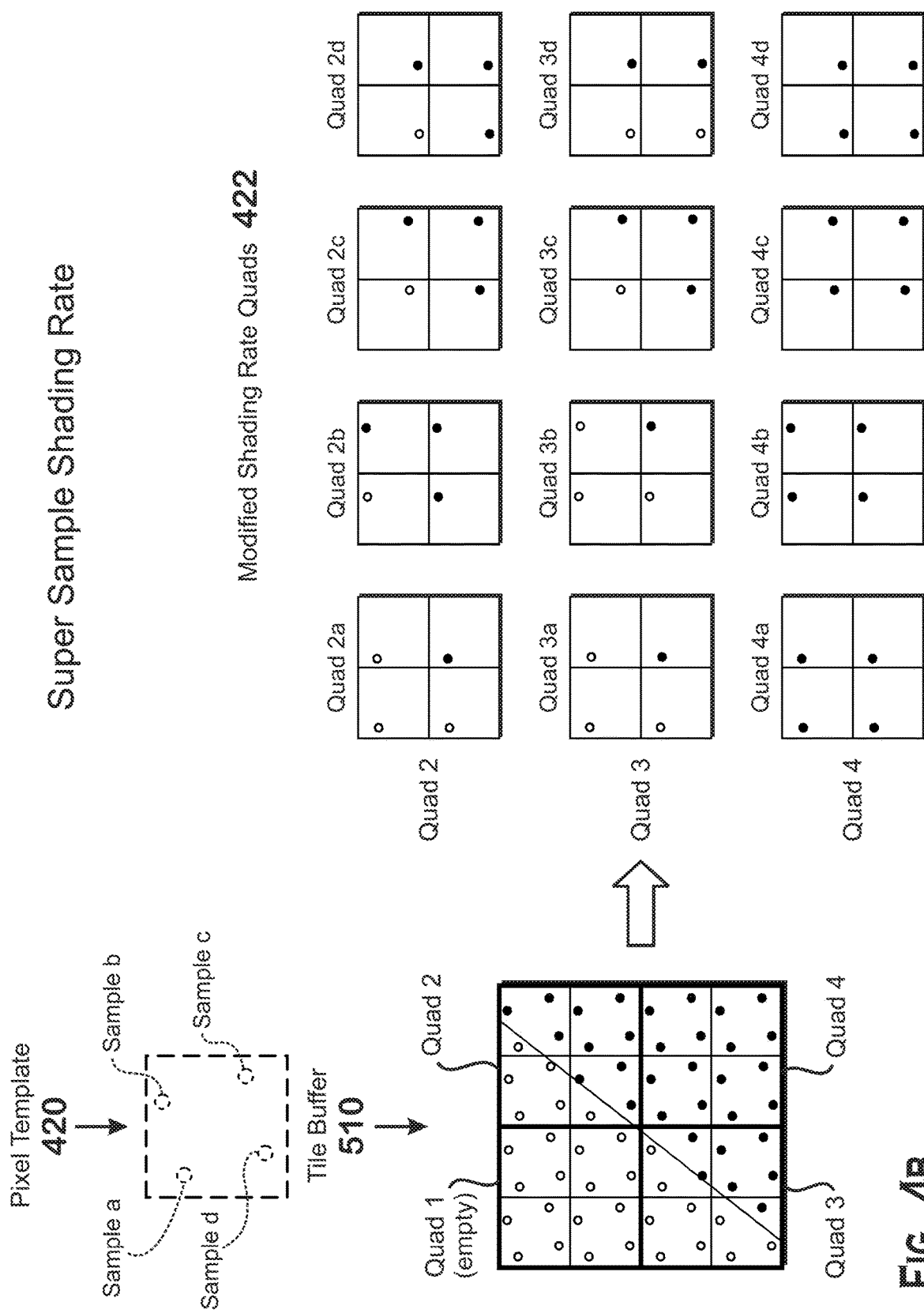

FIG. 4B illustrates operations for generating modified shading rate quads based on the contents of a tile buffer 510 for a super sample shading rate, according to an example. In other words, FIG. 4B represents the operations of step 406 for a super-sampling shading rate. The tile buffer 510 is shown in a state after having accumulated quads generated by the rasterizer stage 314 (step 404). The shading rate determined for the contents of the tile buffer is a super sample shading rate, meaning that pixel shading occurs at a resolution that is higher than the resolution of the render target. In the example of FIG. 4B, the shading rate is 4×, but the teachings herein apply to any super-sample shading rate.

As shown, the tile buffer 510 has 3 quads (the space for quad 1 is empty as there were no covered samples for that quad), each of which has four fragments. Each fragment in the tile buffer 510 has four coverage samples. To generate the modified shading rate quads 422, for each quad in the tile buffer 510 for which at least one sample is covered, the rasterizer stage 314 generates a number of quads equal to the shading rate. Each fragment in the generated quad has a subset of the samples of the fragments in the tile buffer 510.

The ratio of the number of samples of the fragments in the tile buffer 510 to the number of samples of the fragments that are generated is equal to the shading rate. For a 4× shading rate, the fragments in the tile buffer 510 have four times as many samples as the modified shading rate fragments. The fragments in any particular generated quad have samples from the same sample locations of the fragments of a corresponding quad in the tile buffer. In an example, each fragment in a generated quad has a sample at location "sample a" of the pixel template 420 illustrated. In this example, for each quad with at least one covered sample, four quads are generated—one for each sample, such that each generated quad includes fragments with samples at the same sample location and the samples assigned to different quads are different. In the example shown, quad 1 is empty and does not result in any modified shading rate quads. Quad 2 results in quads 2a, 2b, 2c, and 2d being generated. The fragments of quad 2a have sample a from the fragments of quad 2. The fragments of quad 2b have sample b from the fragments of quad 2. The fragments of quad 2c have sample c from the fragments of quad 2. The fragments of quad 2d have sample d from the fragments of quad 2. Quads 3a-3d and 4a-4d derive their samples from quads 3 and 4 in a similar manner. Note that it is possible for the number of coverage samples per fragment to be different from the shading rate. In that case, the fragments of the modified shading rate quads get multiple samples from the quads in the tile buffer.

As described with respect to FIG. 4A, subsequent to generating the modified shading rate quads 422, the centroids for the fragments of the quads are assigned in step 408. The centroids are locations where attributes, such as texture coordinates, are evaluated. A centroid for a fragment is assigned based on the locations of the samples assigned to that fragment. For example, the fragments of quads 2a, 3a, and 4a get centroids at the location of sample a. Similarly, the fragments of quads 2b, 3b, and 4b get centroids at the location of sample b, quads 2c, 3c, and 4c get centroids at the location of sample c, and quads 2d, 3d, and 4d get centroids at the location of sample d. If the modified shading rate quads 422 have multiple samples, then the centroids are located at a location that is representative of those samples. In an example, the centroid is at the location of one of the covered samples, is midway between the covered samples, or is at any other location representative of the samples.

As also described with respect to FIG. 4A, the modified shading rate quads 422 are shaded in step 410. Each fragment of each modified shading rate quad 422 is shaded using a different work-item, and thus the samples that originated from a single fragment in the tile buffer 510 can be given different colors. It is also possible for the pixel shader stage 316 to modify coverage, for example, by marking covered samples as uncovered. At step 414, the output merger stage 318 writes the shaded fragments to the render target. Details on writing shaded samples to a render target are generally known and are not described herein in detail. Generally, this operation includes performing a z-test to determine whether samples are occluded by older samples, and if blending is enabled, blending the color of samples with those in the render target. Other operations may be performed as well.

Figure 4C:
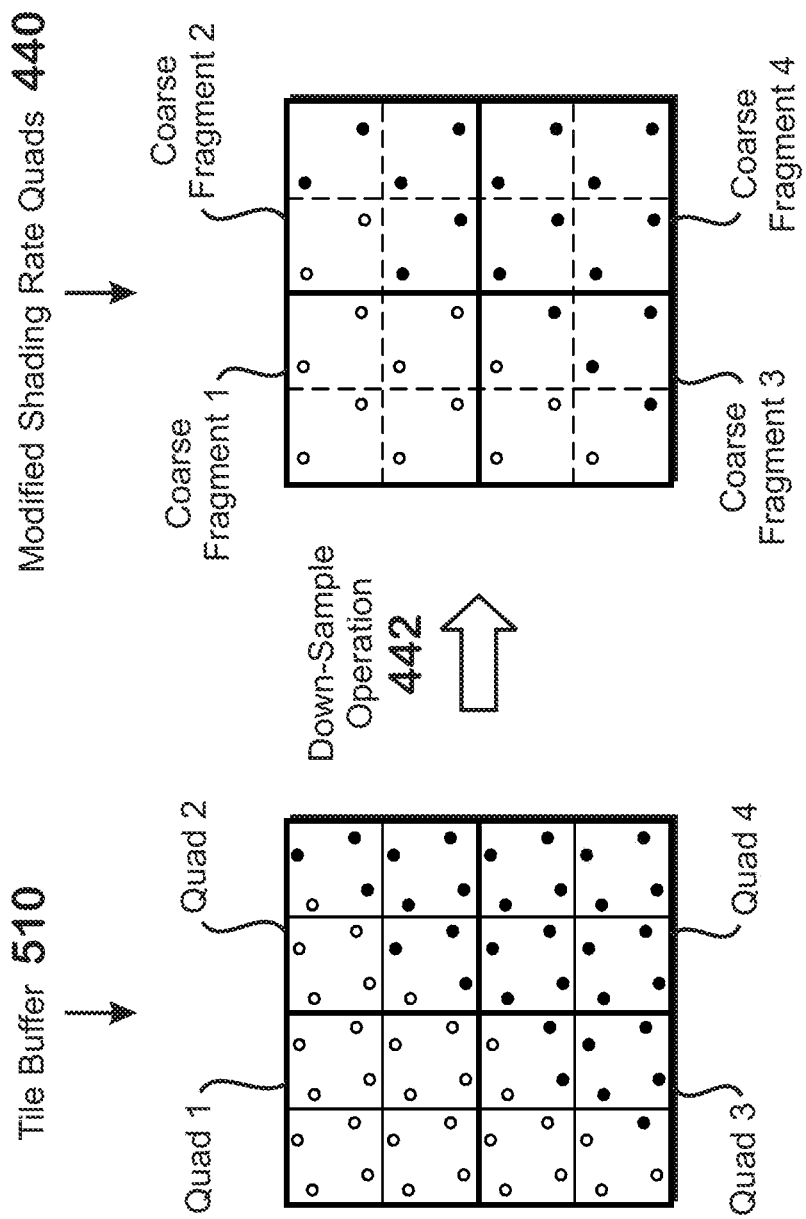

FIG. 4C illustrates operations related to down-sampling quads in the tile buffer 510 when a sub-sample shading rate (VRS) is used, according to an example. The down-sampling operation includes converting the quads of the tile buffer 510 into a smaller number of one or more modified shading rate quads 440. The number of quads generated is equal to the number of quads in the tile buffer 510 multiplied by the shading rate (although a smaller number may be generated if the tile buffer 510 is not completely filled with quads or if there are generated quads that have no coverage). In an example, the shading rate is ¼, the number of quads in the tile buffer 510 is four, and the number of quads that are generated from these quads is one (4*¼=1).

Each generated quad includes four fragments. The coverage assigned to each such fragment is the amalgamation of the coverage assigned to the fragments of the quads in the tile buffer 510. In some situations, such an amalgamation would result in the fragments of the modified shading rate quads 440 having too much coverage data. More specifically, the graphics processing pipeline 134 may have a limitation on the number of bits that can be used to specify coverage data for a fragment. In this situation, when coverage data is amalgamated into coverage data for a fragment of a generated quad, that data is reduced in fidelity (compressed). The coverage data that remains would be geometrically representative of the coverage of the fragments of the quads in the tile buffer 510.

In the example of FIG. 4C, each fragment of the quads in the tile buffer 510 has four samples. Moreover, the shading rate is ¼, meaning that four fragments of the fragments in the tile buffer 510 are shaded together as a single fragment in the pixel shader stage 316. In addition, the pixel shading hardware has a limit on the number of samples that can be processed per fragment, and that limit is eight. Due to these factors, the down-sample operation 442 generates the modified shading rate quads 440 in the following manner. The shading rate of ¼ results in each quad in the tile buffer 510 being converted into a single fragment in the modified shading rate quads 440. Specifically, because each quad has four fragments, and the shading rate is ¼, the four fragments of a quad are converted into a single fragment. Because the tile buffer 510 has four quads, the contents of the tile buffer 510 are converted into a single quad. Each coarse fragment of the quad corresponds to four fragments of the tile buffer 510.

Further, because the pixel shader 316 can only handle 8 samples per fragment, the sixteen samples of each quad in the tile buffer 510 are compressed to eight samples for each coarse fragment. Each sample is geometrically representative of two samples in the tile buffer 510. Further, this compression operation is conservative in that, if either or both of the samples that correspond to a compressed sample is covered in the tile buffer 510, then the sample of the coarse fragment is also covered, but if neither sample is covered, then the sample in the coarse fragment is not covered. In the example of FIG. 4C, dotted lines are provided in the modified shading rate quads 440 to illustrate the corresponding areas of the fragments in the tile buffer 510. It can be seen that each sample in those corresponding areas corresponds to two samples in the tile buffer 510. Moreover, the top-left sample in the portion of the coarse fragment corresponding to the "fine fragment" corresponds to the two top samples of that fine fragment and the bottom-right sample in the portion of the coarse fragment corresponding to the fine fragment corresponds to the two bottom samples of that fine fragment. Note that if the number of samples to be amalgamated into a single coarse fragment does not exceed the sample limit for that fragment, then compression does not occur. Note also that also a shading rate of ¼ is illustrated, other shading rates, such as a ½ horizontal (a row of two fragments in the tile buffer 510 forms a coarse fragment in the modified shading rate quads), ½ vertical (a column of two fragments in the tile buffer 510 forms a coarse fragment in the modified shading rate quads) or any other rate can be used.

After step 406, the centroids are assigned to the fragments of the generated quads. The centroid for each coarse fragment is set in any technically feasible manner. In one example, the centroid is representative of the locations of the covered samples of the coarse fragment. In another example, the location of one of the fragments is chosen. In yet another example, the center of the coarse fragment is used as the centroid. As described above, the centroid is used as the location at which the pixel shader stage 316 calculates attributes such as texture coordinates.

At step 410, the pixel shader stage 316 shades the fragments of the generated quads. Specifically, one work-item per coarse fragment is launched and the color (and other attributes) determined for each coarse fragment is applied to each covered sample of that fragment. It is also possible for the pixel shader stage 316 to modify the coverage of the coarse fragments, such as by setting a covered sample to be not covered or setting a non-covered sample to be covered.

Figure 4D:
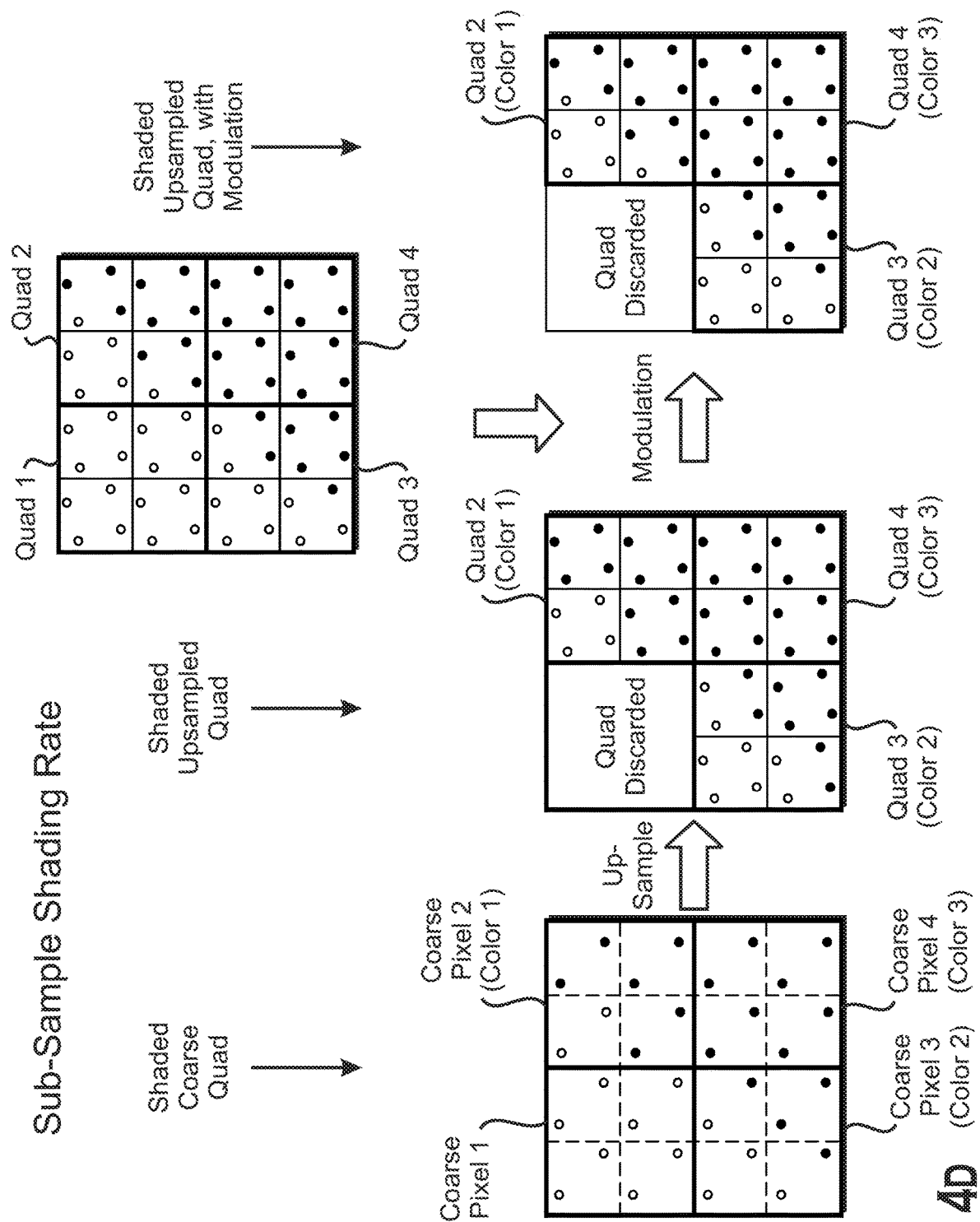

At step 412, the output merger stage 318 applies fine coverage data from the rasterizer stage 314 to the shaded quads to generate fragments at the resolution of the render target. FIG. 4D illustrates an example of this operation. First, the output merger stage 318 up-samples the shaded coarse quads to generate shaded upsampled quads. To do this, output merger stage 318 divides each of the coarse fragments into upsampled fragments based on the shading rate. For a shading rate of ¼, each coarse fragment is converted to four upsampled fragments. The samples of each upsampled fragment get the color of the coarse fragment from which those samples originate. In addition, the sample resolution is restored if the samples were originally compressed, with each restored sample getting the color of the corresponding sample of the coarse fragment. The coverage (covered or not covered) of each restored sample is the same as the coverage of the corresponding sample of the coarse fragment.

In FIG. 4D, the up sample proceeds as follows. The coarse fragment 1 has no coverage. Therefore, the quad that would be generated from that fragment has no coverage and is discarded. Coarse fragment 2 has color 1 and has six covered fragments as shown. The corresponding up-sampled quad (quad 2) has three fragments with four samples covered each and one fragment with no covered samples. Each sample of quad 2 has the color of coarse fragment 2. Similarly, the coverage and colors of coarse fragment 3 and coarse fragment 4 are used to generate quad 3 and quad 4.

At this point, the original coverage data generated by the rasterization stage 314 is used to modulate the coverage data generated in the up-sample operation. The modulation is an "AND" operation wherein if both copies of a sample are covered in the original coverage data and the coverage data from the up-sample operation, then the output sample is considered covered and if either or both samples are uncovered in the original coverage data, then the output sample is considered uncovered. The result is a set of quads, with modulated coverage and with colors generated by the pixel shader 316. The quads are written to the render target as per usual (e.g., depth testing, blending, and other operations are performed to combine the colors of these output quads with the colors in the render target).

It should be understood that many variations are possible based on the disclosure herein. Although features and elements are described above in particular combinations, each feature or element can be used alone without the other features and elements or in various combinations with or without other features and elements. One example is an alternative technique for populating the tile buffer 510 described above. More specifically, in the technique described above, the rasterizer stage 314 first generates quads and then accumulates those quads into the tile buffer 510. In another technique, the rasterizer stage 314 generates the quads in the tile buffer 510 directly and does not need to perform the two separate steps of generating the quads and then accumulating those quads into the tile buffer 510.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing pixel shading and rasterization at different resolutions, the method comprising:
    storing a first set of quads into a tile buffer, wherein the first set of quads has a first number of quads;
    generating a first set of modified shading rate quads at a sub-sampling rate from the first set of quads in the tile buffer, wherein the first set of modified shading rate quads has a second number of quads, wherein the second number of quads are generated from the first number of quads based on the sub-sampling rate;
    storing a second set of quads into the tile buffer, wherein the second set of quads has a third number of quads;
    generating a second set of modified shading rate quads at a super-sampling rate from the second set of quads in the tile buffer, wherein the second set of modified shading rate quads has a fourth number of quads, wherein the fourth number of quads are generated from the third number of quads based on the super-sampling rate; and
    shading the first modified shading rate quads and the second set of modified shading rate quads.

2. The method of claim 1, further comprising:
    determining that a third set of quads is to be shaded at a one-to-one shading rate; and
    shading the third set of quads without generating a set of modified shading rate quads for the third set of quads.

3. The method of claim 1, further comprising:
    determining that the first set of modified shading rate quads has a sub-sampling shading rate, and that the second set of modified shading rate quads has a super-sampling shading rate, based on one of a per-triangle basis, a per-shading rate tile basis, or a per-shading rate tile basis for individual triangles.

4. The method of claim 3, wherein:
    determining that the first set of modified shading rate quads has the sub-sampling shading rate or that the second set of modified shading rate quads has the super-sampling shading rate is performed on a per-triangle basis, which comprises:
    identifying a shading rate for a triangle;
    rasterizing the triangle to generate either the first set of quads or the second set of quads; and
    assigning the shading rate of the triangle to either the first set of quads or the second set of quads.

5. The method of claim 3, wherein:
    determining that the first set of modified shading rate quads has the sub-sampling shading rate or that the second set of modified shading rate quads has the super-sampling shading rate is performed on a per-shading rate tile basis, which comprises:
    identifying a shading rate for a shading rate tile that corresponds to either the first set of quads or the second set of quads; and
    assigning the shading rate of the shading rate tile to either the first set of quads or the second set of quads.

6. The method of claim 5, wherein identifying the shading rate for the shading rate tile includes performing a lookup in a shading rate tile image.

7. The method of claim 3, wherein:
    determining that the first set of modified shading rate quads has the sub-sampling shading rate or that the second set of modified shading rate quads has the super-sampling shading rate is performed on a on a per-shading rate tile basis for individual triangles, which comprises:
    identifying a shading rate for a triangle;
    rasterizing the triangle to generate either the first set of quads or the second set of quads; and
    identifying a shading rate for a shading rate tile that corresponds to either the first set of quads or the second quads within the triangle; and
    assigning the shading rate of the shading rate tile to either the first set of quads or the second set of quads.

8. The method of claim 1, further comprising:
    writing the shaded second set of modified shading rate quads to a render target.

9. The method of claim 1, further comprising:
upsampling the shaded first set of modified shading rate quads and modulating the resulting upsampled quads.

10. A graphics processing pipeline for performing pixel shading and rasterization at different resolutions, the graphics processing pipeline comprising:
a tile buffer;
a rasterizer stage configured to:
store a first set of quads into the tile buffer, wherein the first set of quads has a first number of quads;
generate a first set of modified shading rate quads at a sub-sampling rate from the first set of quads in the tile buffer, wherein the first set of modified shading rate quads has a second number of quads, wherein the second number of quads are generated from the first number of quads based on the sub-sampling rate;
store a second set of quads into the tile buffer, wherein the second set of quads has a third number of quads;
generate a second set of modified shading rate quads at a super-sampling rate from the second set of quads in the tile buffer, wherein the second set of modified shading rate quads has a fourth number of quads, wherein the fourth number of quads are generated from the third number of quads based on the super-sampling rate; and
a pixel shader stage configured to:
shade the first modified shading rate quads and the second set of modified shading rate quads.

11. The graphics processing pipeline of claim 10, wherein the rasterizer stage is further configured to:
determine that a third set of quads is to be shaded at a one-to-one shading rate; and
shade the third set of quads without generating a set of modified shading rate quads for the third set of quads.

12. The graphics processing pipeline of claim 10, wherein the rasterizer stage is further configured to:
determine that the first set of modified shading rate quads has a sub-sampling shading rate, and that the second set of modified shading rate quads has a super-sampling shading rate, based on one of a per-triangle basis, a per-shading rate tile basis, or a per-shading rate tile basis for individual triangles.

13. The graphics processing pipeline of claim 12, wherein:
determining that the first set of modified shading rate quads has the sub-sampling shading rate or that the second set of modified shading rate quads has the super-sampling shading rate is performed on a per-triangle basis, which comprises:
identifying a shading rate for a triangle;
rasterizing the triangle to generate either the first set of quads or the second set of quads; and
assigning the shading rate of the triangle to either the first set of quads or the second set of quads.

14. The graphics processing pipeline of claim 12, wherein:
determining that the first set of modified shading rate quads has the sub-sampling shading rate or that the second set of modified shading rate quads has the super-sampling shading rate is performed on a per-shading rate tile basis, which comprises:
identifying a shading rate for a shading rate tile that corresponds to either the first set of quads or the second quads; and
assigning the shading rate of the shading rate tile to either the first set of quads or the second set of quads.

15. The graphics processing pipeline of claim 14, wherein identifying the shading rate for the shading rate tile includes performing a lookup in a shading rate tile image.

16. The graphics processing pipeline of claim 12, wherein:
determining that the first set of modified shading rate quads has the sub-sampling shading rate or that the second set of modified shading rate quads has the super-sampling shading rate is performed on a on a per-shading rate tile basis for individual triangles, which comprises:
identifying a shading rate for a triangle;
rasterizing the triangle to generate either the first set of quads or the second set of quads; and
identifying a shading rate for a shading rate tile that corresponds to either the first set of quads or the second quads within the triangle; and
assigning the shading rate of the shading rate tile to either the first set of quads or the second set of quads.

17. The graphics processing pipeline of claim 10, further comprising:
an output merger stage configured to write the shaded second set of modified shading rate quads to a render target.

18. The graphics processing pipeline of claim 10, further comprising:
an output merger stage configured to upsample the shaded first set of modified shading rate quads and modulate the resulting upsampled quads.

19. An accelerated processing device ("APD") comprising:
a processing unit configured to execute a pixel shader program; and
a graphics processing pipeline for performing pixel shading and rasterization at different resolutions, the graphics processing pipeline comprising:
a tile buffer;
a rasterizer stage configured to:
store a first set of quads into the tile buffer, wherein the first set of quads has a first number of quads;
generate a first set of modified shading rate quads at a sub-sampling rate from the first set of quads in the tile buffer, wherein the first set of modified shading rate quads has a second number of quads, wherein the second number of quads are generated from the first number of quads based on the sub-sampling rate;
store a second set of quads into the tile buffer, wherein the second set of quads has a third number of quads;
generate a second set of modified shading rate quads at a super-sampling rate from the second set of quads in the tile buffer, wherein the second set of modified shading rate quads has a third number of quads, wherein the fourth number of quads are generated from the third number of quads based on the super-sampling rate; and
a pixel shader stage configured to execute the pixel shader program to:
shade the first modified shading rate quads and the second set of modified shading rate quads.

20. The APD of claim 19, wherein the rasterizer stage is further configured to:
determine that a third set of quads is to be shaded at a one-to-one shading rate; and shade the third set of quads without generating a set of modified shading rate quads for the third set of quads.

* * * * *